United States Patent
Green

(10) Patent No.: US 10,919,216 B2
(45) Date of Patent: Feb. 16, 2021

(54) FOIL DEPOSITION ONTO AN ADDITIVE MANUFACTURED SUBSTRATE

(71) Applicant: Honeywell Federal Manufacturing & Technologies, LLC, Kansas City, MO (US)

(72) Inventor: Nicholas Green, Lees Summit, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

(21) Appl. No.: 16/853,021

(22) Filed: Apr. 20, 2020

(65) Prior Publication Data

US 2020/0247040 A1    Aug. 6, 2020

Related U.S. Application Data

(63) Continuation of application No. 14/962,295, filed on Dec. 8, 2015, now Pat. No. 10,661,502.

(51) Int. Cl.
| | |
|---|---|
| *B29C 64/147* | (2017.01) |
| *B29C 64/153* | (2017.01) |
| *B29C 64/141* | (2017.01) |
| *B33Y 10/00* | (2015.01) |
| *B33Y 40/00* | (2020.01) |
| *B33Y 30/00* | (2015.01) |
| *B29C 64/321* | (2017.01) |
| *B29C 64/218* | (2017.01) |

(52) U.S. Cl.
CPC .......... *B29C 64/141* (2017.08); *B29C 64/321* (2017.08); *B33Y 10/00* (2014.12); *B33Y 30/00* (2014.12); *B33Y 40/00* (2014.12); *B29C 64/147* (2017.08); *B29C 64/153* (2017.08); *B29C 64/218* (2017.08)

(58) Field of Classification Search
None
See application file for complete search history.

(56) References Cited

U.S. PATENT DOCUMENTS

| | | | | |
|---|---|---|---|---|
| 4,460,433 A | * | 7/1984 | Boyd | B29C 65/00 156/574 |
| 5,607,540 A | * | 3/1997 | Onishi | B29C 64/147 156/379.8 |
| 2011/0106290 A1 | * | 5/2011 | Hovel | B22F 7/08 700/120 |

* cited by examiner

*Primary Examiner* — Jeffrey M Wollschlager
*Assistant Examiner* — Armand Melendez
(74) *Attorney, Agent, or Firm* — Hovey Williams LLP

(57) ABSTRACT

An additive manufacturing system and method for forming a part of dissimilar materials. The additive manufacturing system may include a build platform, a recoater for dispensing build powder onto the build platform, an energy source, a foil feed assembly, and a controller for controlling actuation of these components. The method of forming the part may include the steps of depositing a layer of build powder onto the build platform surface, melting selected portions of the layer of build powder, applying a sheet of foil over the layer of build powder, melting selected portions of the sheet of foil onto the layer of build powder, removing the sheet of foil from the layer of build powder, and then lowering the build platform surface to prepare for deposition of a next layer of the build powder. These steps are then repeated one or more times, thereby forming the part.

13 Claims, 3 Drawing Sheets

FOIL DEPOSITION ONTO AN ADDITIVE MANUFACTURED SUBSTRATE

RELATED APPLICATION

The present non-provisional patent application is a continuation of and claims priority to co-pending U.S. patent application Ser. No. 14/962,295, entitled "FOIL DEPOSITION ONTO AN ADDITIVE MANUFACTURED SUBSTRATE", filed on Dec. 8, 2015, the entirety of which is hereby incorporated by reference into the present non-provisional patent application.

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

BACKGROUND

Additive manufacturing, such as three-dimensional (3D) printing, is a process for building 3D objects by adding layer-upon-layer of material. The material is traditionally plastic, however metal, concrete, and other materials may also be used in some cases.

Current additive manufacturing techniques do not allow an easy insertion of sensors, conductive devices, and other dissimilar materials into parts as they are being manufactured. For example, additive manufacturing techniques that use conductive inks generally cannot lay down both the substrate and the conductive trace in the same process.

SUMMARY OF THE INVENTION

Embodiments of the present invention solve the above-mentioned problems and provide a distinct advance in the art of additive manufacturing of a part having two or more dissimilar materials.

Some embodiments of the invention include a method of additive manufacturing of a part having dissimilar materials. The method may include the steps of depositing a layer of build powder onto a build platform, melting selected portions of the layer of build powder, applying a sheet of foil over the layer of build powder, melting selected portions of the sheet of foil onto the layer of build powder, and removing the sheet of foil. These steps may be repeated any plurality of times until the part is completely formed.

In another embodiment of the invention, a method of additive manufacturing of dissimilar materials further includes lowering the build platform prior to repeating the step of depositing a layer of build powder onto the build platform. Furthermore, the step of applying the sheet of foil over the build powder may include dispensing the foil from a first foil roller and pivoting, translating, and/or telescoping a frame away from the first foil roller. The frame may have a second foil roller rotatable thereon and attached to an end of the sheet of foil, such that movement of the frame retractably extends the foil over the build platform. The step of removing the sheet of foil may be performed via rotation of the second foil roller, thereby rolling the used portions of the foil onto the second roller.

In yet another embodiment of the invention, an additive manufacturing system for forming a part of dissimilar materials includes a build platform, a recoater, a directed energy source, a foil feed assembly, and a controller. The build platform may include a surface for receiving build powder deposited thereon and a build platform actuator to actuate the build platform surface upward and downward. The recoater may deposit the build powder onto the build platform surface. The directed energy source may melt selected portions of the build powder deposited onto the build platform surface. The foil feed assembly may include a first foil roller selectively rotatable to feed foil therefrom, a second foil roller selectively rotatable to receive foil thereon, and a frame to which the second foil roller is rotatably attached. The frame may pivot, translate, and/or telescope the second foil roller toward and away from the first foil roller. The controller may be programmed for performing the following steps: commanding the recoater to deposit a layer of build powder onto the build platform surface, commanding the energy source to melt selected portions of the layer of build powder based on computer models of the part, commanding the foil feed assembly to apply a sheet of foil over the layer of build powder, commanding the energy source to melt selected portions of the sheet of foil onto the layer of build powder based on computer models of the part, commanding the foil feed assembly to remove the sheet of foil from the layer of build powder, and commanding the build platform actuator to lower the build platform surface. The controller may also be programmed to repeat each of the above-listed steps a plurality of times, thereby forming the part of dissimilar materials.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
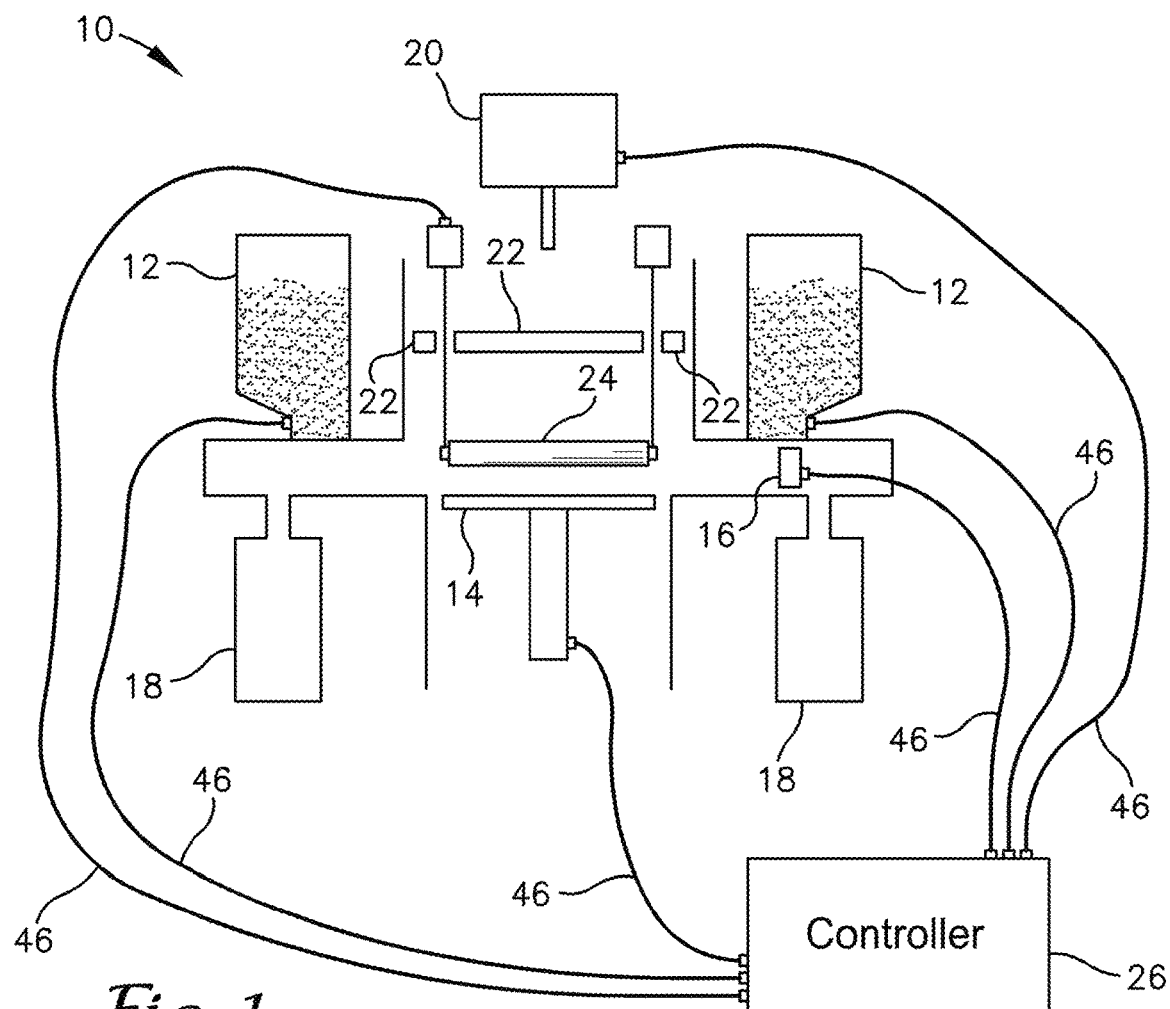
FIG. 1 is a side view of an additive manufacturing system constructed according to embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention, illustrated in FIGS. 1-4, include an additive manufacturing system 10 and a method of additive manufacturing using dissimilar materials. As illustrated in FIG. 1, the system 10 may comprise one or more hoppers 12, a build platform 14, a recoater 16, overflow bins 18, a directed energy source 20, one or more ancillary heaters 22, a foil feed assembly 24, and a controller 26. The dissimilar materials may include, for example, build powder 28, and one or more sheets of foil 30. The build powder 28 may be any additive manufacturing powder known in the art, such as metal, metal alloys, carbon fiber, silicon, plastic, or other such meltable materials in powder form. The sheets of foil 30 may include thin sheets of any substantially malleable metal known in the art, such as aluminium, tin, copper, gold, or the like.

The hoppers 12 may be any size and shape container known in the art and may have any ports, hoses, valves, or dispensing elements for selectively dispensing the build powder 28 from the hoppers into the recoaters 16. In some embodiments of the invention, the hoppers 12 may include a first hopper and a second hopper between which the recoater 16 may travel, such that the build powder 28 may be provided at both ends of a travel path of the recoater 16. However, one hopper may be used without departing from the scope of the invention. Additionally or alternatively, there may be a single hopper having two dispenser openings, one at one end of the travel path of the recoater 16 and one at an opposite end of the travel path.

As illustrated in FIG. 1, the build platform 14 may comprise a build platform surface, such as a horizontal build plate or base plate, a build platform actuator, and at least one vertical wall surrounding the build platform surface. The build platform surface may be vertically movable relative to the vertical walls using built platform actuators, such as electric motors, pumps, circuits, robotic components, mechanical actuation components, hydro-mechanical components, electro-mechanical components, or the like, controlled hydraulically, electrically, or manually via a user and/or the controller 26. For example, the build platform 14 may include a build plate that sits on top of a rectangular, horizontal elevator plate, where four vertical walls enclose the elevator plate. The walls may have ledges or wide flanges extending substantially perpendicularly from a top edge thereof, providing a surface on which the build powder 28 may be dispensed and/or at which the recoater may begin its travel path across the build plate.

The recoater 16 may include any combination of devices known in the art for dispensing and/or spreading the build powder 28 across the surface of the build platform 14. For example, the recoater 16 may include recoating mechanisms having a flexible or a stiff blade, which enables an even and homogeneous build powder 28 layer by movement of the blade. The powder 28 may be provided by one of the hoppers 12, and then the blade may be actuated to pull the powder 28 across the build platform surface and to an opposite side of the build platform. In some embodiments of the invention, the recoater 16 may comprise or be coupled to a recoater actuator configured to actuate the blade or other recoating mechanisms across the build platform. The recoater actuator may include electric motors, pumps, circuits, robotic components, mechanical actuation components, hydro-mechanical components, electro-mechanical components, or the like, and may be controlled hydraulically, electrically, or manually to actuate the recoater 16 in the desired direction.

As illustrated in FIG. 1, the overflow bins 18 may be positioned at any location outward of the build platform 14. The overflow bins 18 may be any containers configured and positioned to catch or receive any leftover or unmelted build powder 28 from the recoater 16, the hoppers 12, and/or the build platform 14. In some embodiments of the invention, the overflow bins 18 may detach from other components of the additive manufacturing system 10 and contents thereof may be dumped or otherwise emptied from the overflow bins 18 to the hoppers 12 for reuse.

The directed energy source 20 may be any kind as is known in the art including but not limited to a laser, electron beam, or other source of directed energy sufficient for selective laser sintering of foils and/or build powders known in the art. The energy source 20 may be movably attached to a track such that the energy source 20 may move anywhere in the three-dimensional space above the build platform 14. In one embodiment, the energy source 20 may be movable within a two-dimensional plane parallel to and above the build platform 14. The energy source 20 may also be movable such that it can direct its energy in any direction or angle relative to the plane parallel to the build platform 14. The movement, position, and direction of the energy source 20 may be manually controlled or caused by one or more directed energy source actuators, such as electric motors, pumps, circuits, robotic components, mechanical actuation components, hydro-mechanical components, electro-mechanical components, or the like, controlled hydraulically, electrically, or manually via a user and/or the controller 26.

Figure 2:
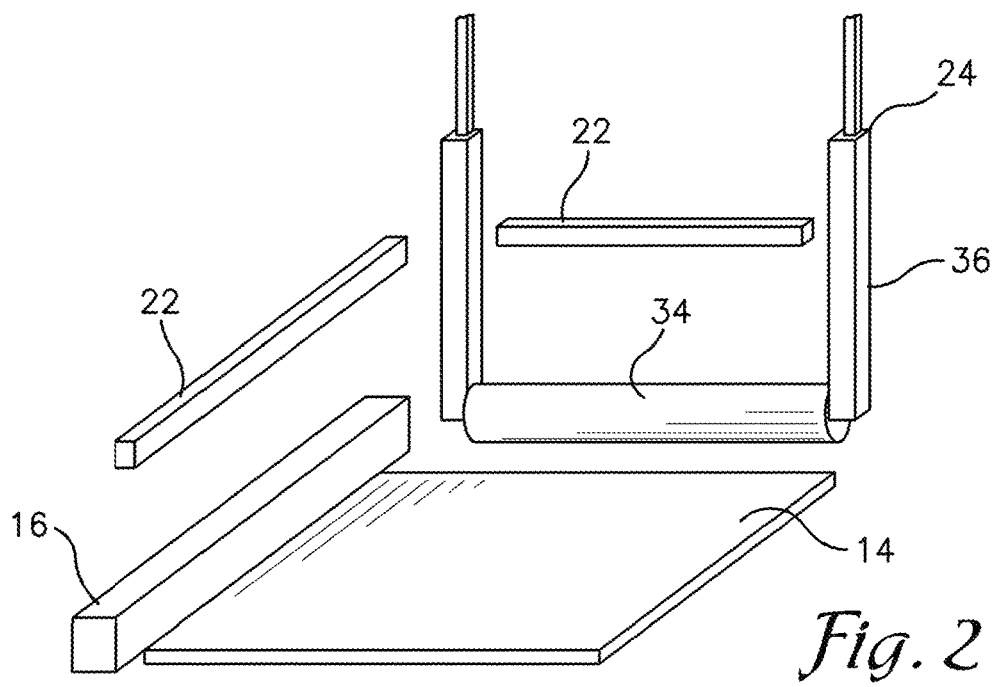
FIG. 2 is a perspective view of a recoater, build platform, and foil feed assembly of the additive manufacturing system of FIG. 1.

The ancillary heaters 22, as illustrated in FIGS. 1 and 2, may comprise non-directed energy sources configured to substantially uniformly heat the build powder 28 deposited on the build platform 14. In some embodiments of the invention, the ancillary heaters 22 may heat the build powder 28 close to a melting temperature of the build powder 28, thus preheating the build powder 28 in preparation thereof for selective melting of the build powder 28 by the directed energy source 20.

As illustrated in FIGS. 1-4, the foil feed assembly 24 may comprise any device configured to provide one or more of the sheets of foil 30 in a substantially automated manner based on signals received from the controller 26 and/or a user. Specifically, the foil feed assembly 24 may comprise a first foil roller 32 with an associated first stopping mechanism, a second foil roller 34 with an associated second stopping mechanism, and a frame 36 to which the second foil roller 34 is rotatably attached. The first foil roller 32 may be selectively rotatable and configured to feed one or more sheets of the foil 30 therefrom. The second foil roller 34 may be attachable to an end or a portion of the sheets of foil 30 and may also be selectively rotatable, so as to receive used sheets of the foil 30 thereon after selective melting of the foil 30 by the directed energy source 20, as later described herein.

Figure 3:
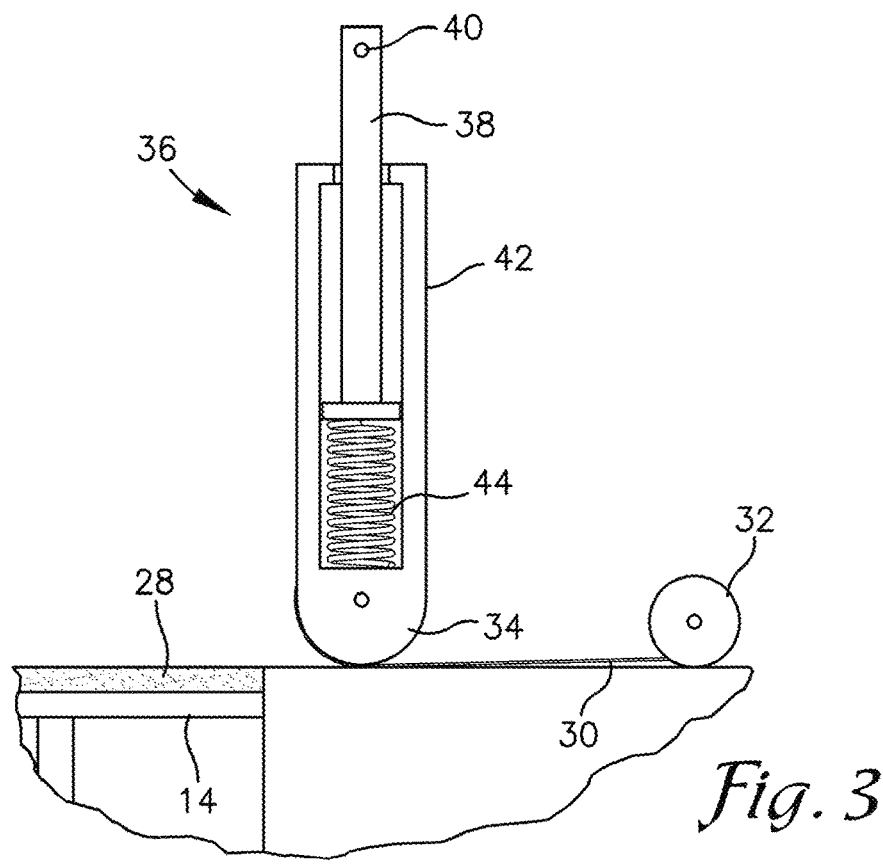
FIG. 3 is a cross-sectional view of the foil feed assembly of FIG. 2 in a starting, retracted position.
Figure 4:
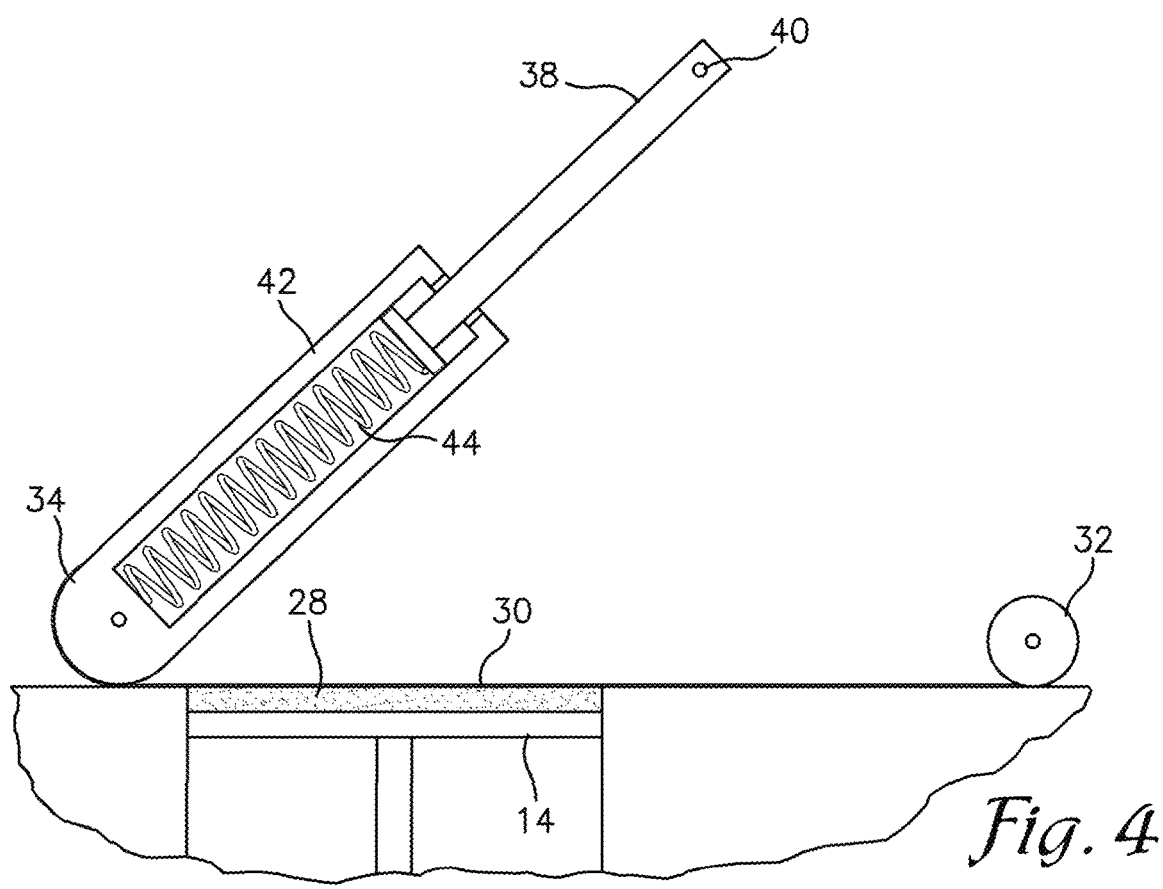
FIG. 4 is a cross-sectional view of the foil feed assembly of FIG. 2 in a pivoted, extended configuration.

As illustrated in FIGS. 3 and 4, the frame 36 may be configured to pivot, translate, and/or telescope the second foil roller toward and away from the first foil roller. In some embodiments of the invention, the frame 36 may include a shaft 38 pivotable about a pivot point 40, and a tube 42. The tube 42 may be spring-biased by way of a spring 44 or the like to telescope toward and away from the pivot point 40 as the shaft is pivoted toward and away from the first foil roller 32.

In one example embodiment of the invention, the first foil roller 32 may be rotatable about an axis to release the sheet or sheets of foil 30 while the second stopping mechanism prohibits rotation of the second foil roller 34 and while the frame 36 pivots, translates, and/or telescopes in a direction away from the first foil roller 32, thereby extending the sheet of foil 30 across the build powder 28 on the build platform 14. To retract the used foil 30 onto the second foil roller 34, the second foil roller 34 may be released by the second stopping mechanism and/or actuated to rotate (manually or by way of an actuator in communication with the controller 26), thus rolling the used foil 30 thereon while the first stopping mechanism prohibits rotation of the first foil roller 32. Furthermore, the frame 36 may simultaneously or subsequently pivot, translate, and/or telescope in a direction back toward the first foil roller 32 in preparation for extending another portion of the sheet the foil 30 across the build powder 28 on the build platform 14. In embodiments of the invention in which the frame 36 is both pivotable and spring-biased, the second foil roller 34 can serve as both a compaction roller for pressing the foil 30 against the build powder 28 on the build platform 14 and a recovery roller for receiving used (e.g., partially melted) foil 30 thereon.

The controller 26 may comprise any number of combination of controllers, circuits, integrated circuits, programmable logic devices such as programmable logic controllers (PLC) or motion programmable logic controllers (MPLC), computers, processors, microcontrollers, transmitters, receivers, other electrical and computing devices, and/or residential or external memory for storing data and other information accessed and/or generated by the system 10. The controller 26 may control operational sequences, power, speed, motion, or movement of any of the actuators described herein and/or temperatures of the directed energy source 20 and/or the ancillary heaters 22.

The controller 26 may be configured to implement any combination of algorithms, subroutines, computer programs, or code corresponding to method steps and functions described herein. The controller 26 and computer programs described herein are merely examples of computer equipment and programs that may be used to implement the present invention and may be replaced with or supplemented with other controllers and computer programs without departing from the scope of the present invention. While certain features are described as residing in the controller 26, the invention is not so limited, and those features may be implemented elsewhere. For example, databases may be accessed by the controller 36 for retrieving CAD data or other operational data without departing from the scope of the invention.

The controller 26 may implement the computer programs and/or code segments to perform various method steps described herein. The computer programs may comprise an ordered listing of executable instructions for implementing logical functions in the controller 26. The computer programs can be embodied in any computer-readable medium for use by or in connection with an instruction execution system, apparatus, or device, and execute the instructions. In the context of this application, a "computer-readable medium" can be any physical medium that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

The residential or external memory may be integral with the controller 26, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements.

As illustrated in FIG. 1, the system 10 may further comprise electrical and/or communication conduits 46, electrically and/or communicably coupling provide electrical power to the actuators 20, the powder hopper 16, the deposition device 18, the nozzles or nozzle solenoids, the build platform 14, and/or the directed energy source 20. Additionally or alternatively, the conduits 46 may be configured to provide communication links between the controller 36 and any of the actuators 20, the powder hopper 16, the deposition device 18, the nozzles or nozzle solenoids, the build platform 14, and the directed energy source 20.

A method of additive manufacturing using dissimilar materials may generally include the steps of depositing a layer of the build powder 28 onto the build platform 14, melting selected portions of the layer of build powder 28, applying a sheet or portion of a sheet of foil 30 over the layer of build powder 28, melting selected portions of the foil 30 onto the layer of build powder 28, and removing the sheet of foil 30. Next, these steps may each be repeated one or more times, adding layer upon layer until forming a completed part having dissimilar materials.

Figure 5:
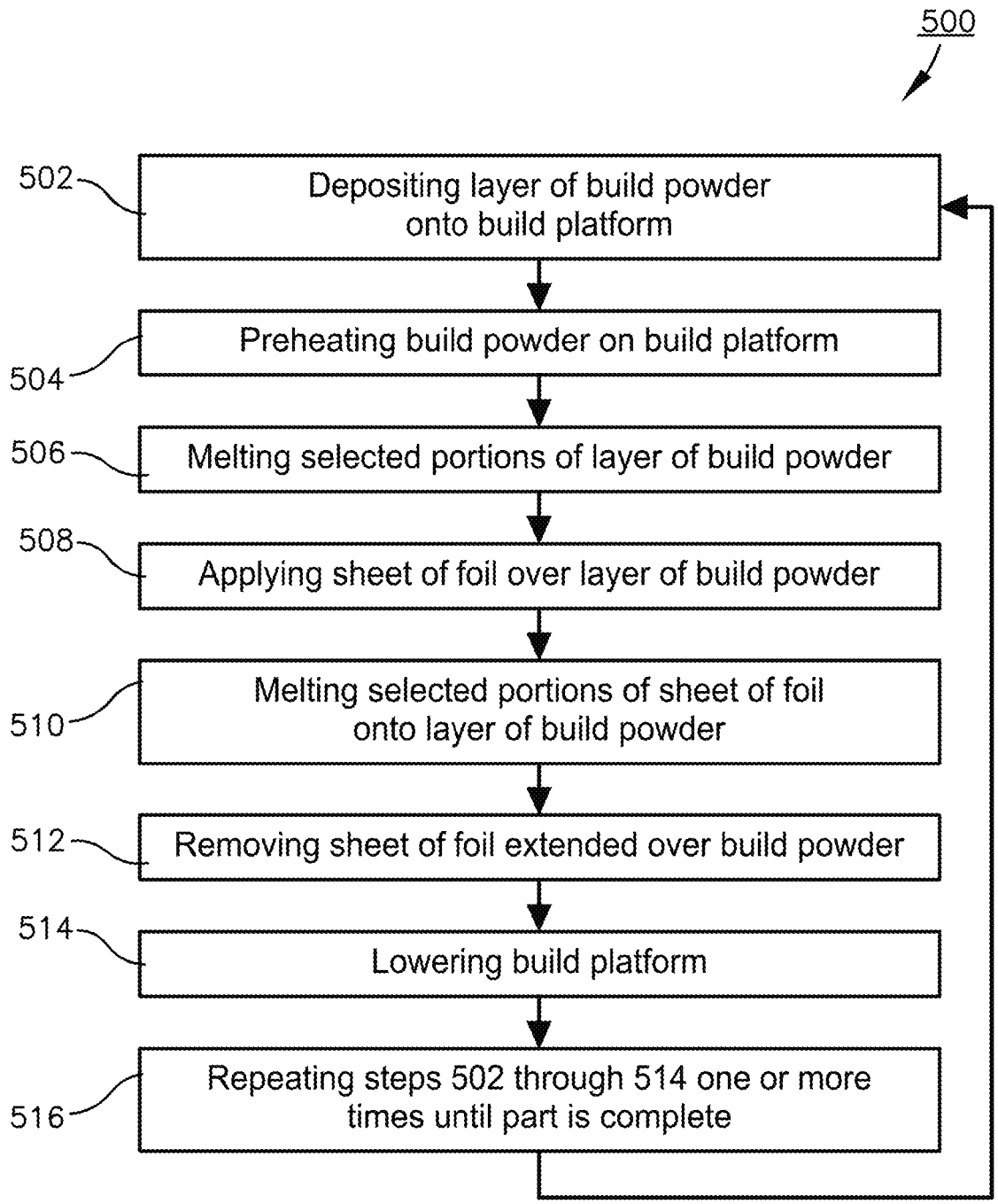
FIG. 5 is a flow chart illustrating a method of additive manufacturing a part having dissimilar materials in accordance with embodiments of the present invention.

Method steps for additive manufacturing using dissimilar materials will now be described in more detail, in accordance with various embodiments of the present invention. The steps of the method 500 may be performed in the order as shown in FIG. 5, or they may be performed in a different order. Furthermore, some steps may be performed concurrently as opposed to sequentially. In addition, some steps may not be performed.

The method 500 may include a step of depositing a layer of the build powder 28 onto the build platform 14, as depicted in block 502. Note that subsequent layers of the build powder 28 added to the part may not be deposited directly on the build plate (i.e., not directly contacting the build plate), but may instead be deposited onto a previous layer of the part being formed on the build plate. This depositing step may be accomplished by dispensing a desired amount of build powder 28 from one of the hoppers 12, and then actuating the recoater 16, via command signals provided by the controller 26, to spread the dispensed build powder 28 across the build platform 14 or the build plate thereof. In some embodiments of the invention, the build powder 28 may be dispensed onto the ledges or wide flanges extending substantially perpendicularly from the top edges of the build platform walls, and the recoater 16 may push or pull the build powder 28 across the build plate, with the recoater defining a top boundary of the build powder layer, the walls of the build platform forming side boundaries of the build powder layer, and the build plate (or previously layer of the part being formed) forming a bottom boundary of the build powder layer being deposited in step 502. Additionally or alternatively, the recoater 16 may have the build powder 28 contained therein and evenly dispensed therefrom as the recoater 16 is actuated across the build plate.

The method 500 may further include the steps of preheating the build powder 28 with the ancillary heaters 22 to a temperature slightly below a melting temperature of the build powder 28, as depicted in block 504, and/or melting selected portions of the layer of build powder 28, as depicted in block 506. In some embodiments of the invention, the preheating step may be omitted without departing from the scope of the invention. The selected portions of the build powder 28 melted in step 506 may be selected by the controller 26 based on computer models of the part, such as three-dimensional computer aided design (CAD) models and the like. Specifically, the directed energy source 20 may be actuated and/or turned on and off according to the three-dimensional CAD models or other computer-implemented instructions provided by the controller 26.

Next, the method 500 may include a step of applying the sheet of foil 30 over the layer of build powder 28, as depicted in block 508. In some embodiments of the invention, this step may include rotating or allowing free rotation of the first foil roller 32 to release the sheet of foil 30 while prohibiting rotation of the second foil roller 34 and simultaneously pivoting, translating, and/or telescoping at least a portion of the frame 36 associated with the second foil roller 34, such that the second foil roller 34 is moved in a direction away from the first foil roller 32, thereby extending the sheet of foil 30 across the layer of build powder 28. For example, the frame's shaft 38 may rotate about the pivot point 40 in a direction away from the first foil roller 32, and the tube 42 may telescope in a direction away from the pivot point 40 in response to release of spring compression as the shaft 38 is pivoted away from the first foil roller 32.

The method 500 may then include a step of melting selected portions of the sheet of foil 30 onto the layer of build powder 28, as depicted in block 510. In some embodiments of the invention, the selected portions of the sheet of foil 30 in step 510 may be selected by the controller 26 based on computer models of the part, such as CAD models and the like. The CAD models or other such computer models may be different for the build powder layers than for the foil pattern being formed thereon, such that the pattern or portion of the part formed by the foil 30 may be embedded within the part or portion of the part being formed by the build powder 28.

The method 500 may also comprise a step of removing the sheet of foil 30 extended over the build powder 28, as depicted in block 512, or removing what remains of the sheet of foil 30 after the melting step 510. In some embodiments of the invention, step 512 may include prohibiting rotation of the first foil roller 32 while rotating the second foil roller 34 relative to the frame 36, thereby retracting the used sheet of foil 30 onto the second foil roller 34. The method step 512 may also include subsequently or simultaneously pivoting, translating, and/or telescoping at least a portion of the frame 36 back toward the first foil roller 32, to its starting position. This may be performed via an actuation command provided by the controller 26 to pivot the frame 36 back toward the first foil roller 32.

Next, the method 500 may include a step of lowering the build platform 14, as depicted in block 514. This may include the controller 26 commanding the build platform actuator to actuate the build platform or build plate in a downward direction. Additionally or alternatively, the walls surrounding the build plate may be actuated upward and/or the recoater 16 may be actuated upward, such that the additive manufacturing system 10 is in a position to perform formation of another layer of the build powder 28 onto a previously layer of both build powder 28 and selectively melted foil 30.

Finally, the method 500 may include a step of repeating steps 502 through 514 one or more times, as depicted in block 516, thereby forming the part of dissimilar materials. The part is thus made of sintered powder material and foil deposited material. Each subsequent layer may include both the application and melting of the build powder 28 and the foil 30, or one or more of the layers may omit the foil 30 or the build powder 28, such that some of the layers of the part formed thereby include only the melted build powder 28 or only the foil 30. The method 500 may be used to allow the creation of parts with embedded sensors, circuits, wires, conductive pathways, or various multi-function printed objects, and advantageously allows for dissimilar plastics and/or metals to be manufactured into a single part while sharing the same energy source (i.e., the directed energy source 20). The method 500 may also be used for stiffening of printed parts and/or for the manufacturing of electronic devices, motor housing, toys, clothes, etc. Other potential uses of the method 500 include creating a thermal gradient with dissimilar metals to create a current galvanic reaction for producing voltage.

In some embodiments of the invention, multiple types of foil and/or multiple types of build powder may be used, such that more than two dissimilar materials are included in the final part. Furthermore, in some embodiments of the invention, the method 500 may be used to simultaneously build a plurality of parts, based on the patterns utilized by the directed energy source 20 and the controller 26. Furthermore, the method 500 may be used to simultaneously build some parts with dissimilar materials and some parts without dissimilar materials, which only include, for example, the build powder 28.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An additive manufacturing system for forming a part of dissimilar materials, the additive manufacturing system comprising:
   a build platform;

a recoater configured for distributing build powder over the build platform;
a feed assembly comprising:
　a first roller configured to feed a sheet of material therefrom,
　a second roller configured to receive the sheet of material thereon, and
　a frame supporting the second roller and configured to laterally pivot and telescope so that the second roller is movable relative to the first roller to extend a portion of the sheet of material over the build platform; and
a directed energy source configured for melting selected portions of the build powder and selected portions of the sheet of material to form the part.

2. The additive manufacturing system of claim 1, wherein the build platform comprises a surface and an actuator configured to actuate the surface upward and downward.

3. The additive manufacturing system of claim 1, wherein the build powder comprises a different material than the sheet of material.

4. The additive manufacturing system of claim 1, wherein the first roller and the second roller are separately rotatable.

5. The additive manufacturing system of claim 2, further comprising a controller programmed for performing the following steps:
　(a) commanding the recoater to deposit a layer of build powder on at least one of the surface of the build platform or the sheet of material,
　(b) commanding the directed energy source to melt selected portions of the layer of build powder,
　(c) commanding the feed assembly to laterally pivot and telescope the frame to move the second roller away from the first roller with the sheet of material attached to the second roller, thereby extending the sheet of material over the layer of build powder,
　(d) commanding the directed energy source to melt selected portions of the sheet of material onto the layer of build powder;
　(e) commanding the feed assembly to remove a remaining portion of the sheet of material from the layer of build powder;
　(f) commanding the actuator to lower the surface of the build platform; and
　(g) repeating steps (a) through (e) one or more times, thereby forming the part.

6. The additive manufacturing system of claim 5, wherein step (c) comprises—
　directing the feed assembly to rotate the first roller,
　directing the feed assembly to prohibit rotation of the second roller, and
　directing the feed assembly to pivot the frame so that the second roller is moved laterally away from the first roller, thereby extending the sheet of material over the layer of build powder.

7. The additive manufacturing system of claim 5, wherein removing step (e) programmed onto the controller comprises—
　directing the feed assembly to rotate the first roller, and
　directing the feed assembly to rotate the second roller.

8. The additive manufacturing system of claim 1, wherein the frame comprises—
　a shaft pivotable about a pivot point, and
　a tube that is spring-biased to telescope away from the pivot point and is operable to telescope toward the pivot point in response to compression provided by the second roller pressing a portion of the sheet of material against the build platform, the build powder on the build platform, or the part being formed as the shaft is pivoted about the pivot point.

9. An additive manufacturing system for forming a part of dissimilar materials, the additive manufacturing system comprising:
　a build platform comprising a surface configured for receiving build powder deposited thereon and
　　a build platform actuator configured to actuate the build platform surface upward and downward;
　a recoater configured for distributing the build powder onto the build platform surface;
　a directed energy source configured for melting selected portions of the build powder deposited onto the build platform surface;
　a foil feed assembly comprising:
　　a first foil roller selectively rotatable and configured to feed a sheet of foil therefrom,
　　a second foil roller selectively rotatable and configured to receive the sheet of foil thereon, and
　　a frame to which the second foil roller is rotatably attached, wherein the frame is configured to pivot and telescope the second foil roller toward and away from the first foil roller in a lateral direction; and
　a controller programmed for performing the following steps:
　　(a) commanding the recoater to deposit a layer of build powder onto the build platform surface,
　　(b) commanding the directed energy source to melt selected portions of the layer of build powder, based on computer models of the part,
　　(c) commanding the foil feed assembly to apply the sheet of foil over the layer of build powder,
　　(d) commanding the directed energy source to melt selected portions of the sheet of foil onto the layer of build powder, based on computer models of the part;
　　(e) commanding the foil feed assembly to remove the sheet of foil from the layer of build powder;
　　(f) commanding the build platform actuator to lower the build platform surface; and
　　(g) repeating steps (a) through (f) one or more times, thereby forming the part.

10. The additive manufacturing system of claim 9, wherein step (c) comprises—
　rotating the first foil roller to release the sheet of foil;
　prohibiting rotation of the second foil roller, wherein the second foil roller is attached to a portion of the sheet of foil; and
　pivoting and telescoping at least a portion of the frame such that the second foil roller is moved in a direction away from the first foil roller, thereby extending the sheet of foil across the layer of build powder.

11. The additive manufacturing system of claim 10, wherein step (e) comprises—
　prohibiting rotation of the first foil roller;
　rotating the second foil roller relative to the frame, thereby retracting the sheet of foil onto the second foil roller; and
　pivoting and telescoping at least a portion of the frame back toward the first foil roller.

12. The additive manufacturing system of claim 9, wherein the frame includes a shaft pivotable about a pivot point and a tube, wherein the tube is spring-biased to telescope toward and away from the pivot point in response to compression provided by at least one of the build platform and the part, during formation thereof, when the shaft is pivoted toward and away from the first foil roller.

13. The additive manufacturing system of claim 9, further comprising an ancillary heater configured to preheat the build powder prior to step (b).

* * * * *